United States Patent [19]

Hasegawa

[11] Patent Number: 4,745,676
[45] Date of Patent: May 24, 1988

[54] METHOD FOR MANUFACTURING A MAGNET HEAD

[75] Inventor: Tadashi Hasegawa, Koriyama, Japan

[73] Assignee: Mitsubishi Denki Kabushiki Kaisha, Tokyo, Japan

[21] Appl. No.: 827,266

[22] Filed: Feb. 7, 1986

[30] Foreign Application Priority Data

Feb. 27, 1985 [JP] Japan .................................. 60-36274

[51] Int. Cl.$^4$ ............................................... G11B 5/42
[52] U.S. Cl. ...................................... 29/603; 29/418; 51/323
[58] Field of Search .................. 29/603, 418; 360/118, 360/121, 125, 127; 51/117, 118, 323

[56] References Cited

U.S. PATENT DOCUMENTS

| | | | |
|---|---|---|---|
| 3,846,840 | 11/1974 | Childers et al. | ................. 29/603 X |
| 4,058,846 | 11/1977 | Knutson . | |
| 4,506,308 | 3/1985 | Furuichi | ........................... 29/603 X |

FOREIGN PATENT DOCUMENTS

| | | |
|---|---|---|
| 0031402 | 7/1981 | European Pat. Off. . |
| 0110050 | 6/1984 | European Pat. Off. . |
| 3427253 | 2/1985 | Fed. Rep. of Germany . |
| 3427252 | 2/1985 | Fed. Rep. of Germany . |
| 0150126 | 9/1983 | Japan ..................................... 29/603 |

OTHER PUBLICATIONS

IBM Tech Disclosure Bulletin; vol. 21, No. 11, p. 4373; by Robinson et al; Apr. 1979.

Primary Examiner—Carl E. Hall
Attorney, Agent, or Firm—Oblon, Fisher, Spivak, McClelland & Maier

[57] ABSTRACT

A magnetic head of a construction, wherein first and second magnetic cores each having a magnetic gap are joined together with first and second non-magnetic structures, and the lamination is such that the first magnetic core is in contact with the second non-magnetic structure, and that the second magnetic core is in contact with the first non-magnetic structure, the magnetic head having its feature in that it is made up of the magnetic core members and the non-magnetic core members which are combined in the form of a letter "W" in its cross-section having mutually parallel and upright leg portions.

A method for manufacturing the magnetic head of the above construction, having its feature in that it comprises the first step of producing a core body having a shape such that an open end part of a combination of the magnetic member and the non-magnetic member is closed; and the second step of placing the core body in an opening or openings formed in a carrier plate, followed by subjecting the core body to the polishing work.

1 Claim, 7 Drawing Sheets

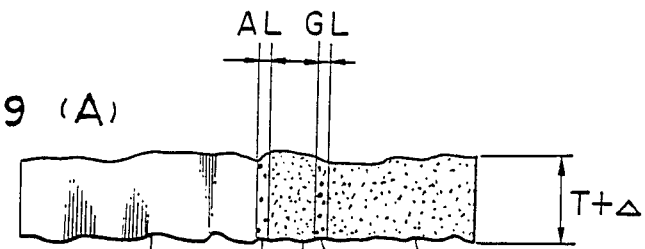
FIGURE 9 (A)
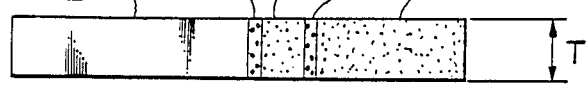
FIGURE 9 (B)
FIGURE 10
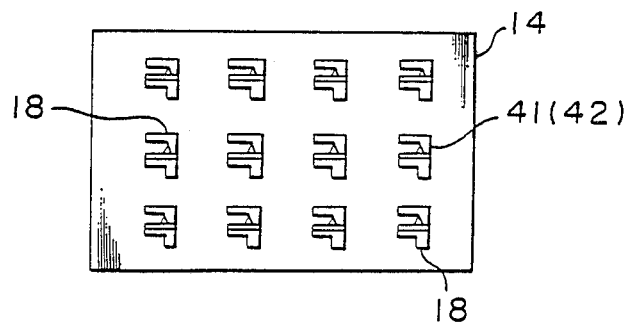
FIGURE 11
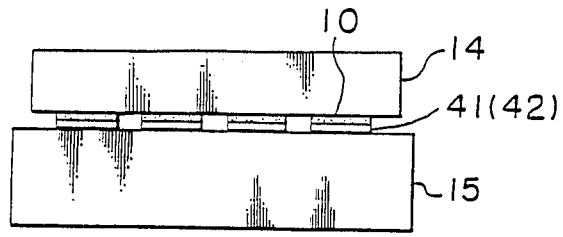

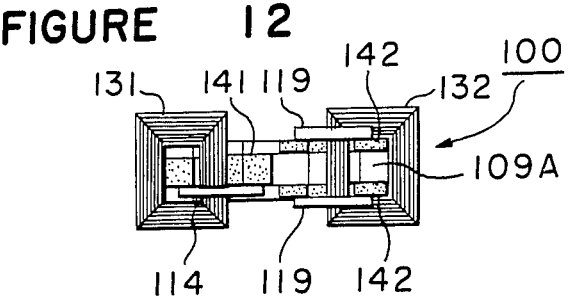
FIGURE 12
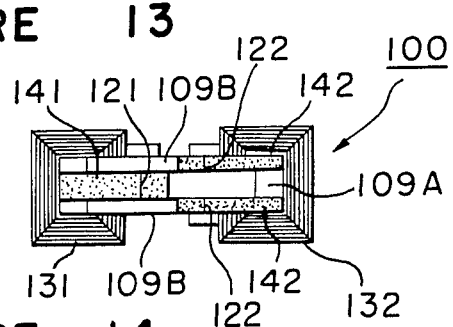
FIGURE 13
FIGURE 14
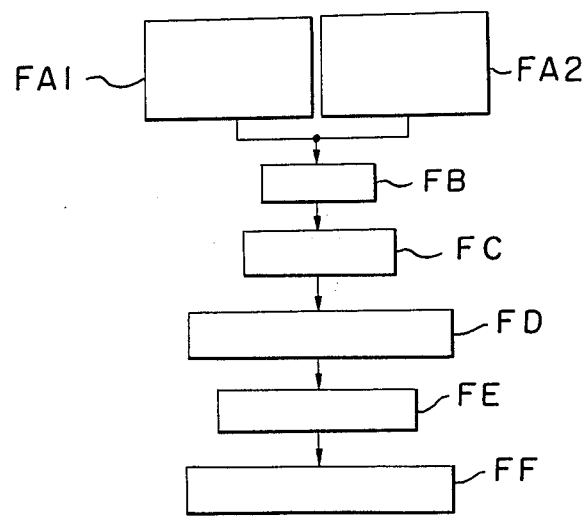

METHOD FOR MANUFACTURING A MAGNET HEAD

This invention relates to a magnetic head of a magnetic disc device for use as, for example, an external memory device. More particularly, the present invention is concerned with a magnetic head suitable for such a memory device which has its core made of a hard and brittle material as the principal component. The present invention is also concerned with a method for manufacturing such magnetic head.

As one of the external memory devices on a small-sized computer for example, there has been used widely a flexible disc device (which will hereinafter be called simply "floppy"). As the magnetic head to be used as the driver for this floppy, there has been known one which is disclosed in, for example, Unexamined Japanese Patent Publication No. 40118/1975. This magnetic head is of a three-layered structure, in which a recording-and-reproducing core and two erasing cores are in an alternate arrangement, the former being magnetically insulated from the latter.

In the following, a conventional magnetic head and a method for its manufacture will be described in reference to the accompanying drawing. FIGS. 2 to 4 illustrate one example of the conventional magnetic head, wherein FIG. 2 is a front view of the magnetic head; FIG. 3 is a plan view of it; and FIG. 4 is a bottom view thereof. In these FIGS. 2 to 4, the magnetic head 1 is made up of two erasing cores 42 and a single recording-and-reproducing core 41 as the principal structural elements, each of the cores 41, 42 being provided with a recording-and-reproducing magnetic gap 21 and an erasing magnetic gap 22. A transverse plate 14 and a transverse plate 19 which constitute magnetic paths are respectively joined with the cores 41 and 42 by means of a thin adhesive layer of an epoxy type or cyanoacrylic type adhesive agent having a thickness of approximately 10 μm or thinner. As the consequence of this, the magnetic flux concentration takes place at each of the magnetic gaps 21 and 22 where the magnetic resistance is the highest. On account of this, when a required electric current is applied to the well-known magnetic ring, i.e., the recording-and-reproducing winding 31 based on the theory of electro-magnetic conversion, there can be obtained a magnetic flux necessary for the recording-and-reproducing magnetic gap 21; inversely, when the magnetic head 1 travels on and through information tracks recorded on the magnetic medium, there can be obtained a corresponding electric voltage in the recording-and-reproducing winding 31 due to the change in the magnetic flux to be produced in the recording-and-reproducing magnetic gap 21. By the way, the two erasing cores 42 possess the required recording density as well as interchangeability among various floppy memory devices; in other words, it can be effectively used for recording by one memory device and reproducing by another recording device, as is taught in U.S. Pat. specification No. 2,987,582.

In the following, the method for manufacturing the above-described magnetic head will be explained in reference to FIG. 5 which illustrates a flow chart of the principal steps for its manufacture, and FIGS. 6 to 11 which illustrate schematically what is actually done at each of the manufacturing steps.

To begin with, the first magnetic material 71, the second magnetic material 72 and the non-magnetic material 81 are put together with glass 9, or an epoxy type adhesive agent, or a cyanoacrylic type adhesive agent to form an integral core structure as shown in FIG. 6 (vide: steps F1 and F2 in FIG. 5). Subsequently, the integral core structure is halved along the center cutting line 11, and then each of the halved structures is sliced along the slice-cutting line 12 on an outer or inner blade-type slicing table (vide: step F3 in FIG. 5), whereby the erasing core 42 as shown in FIG. 7 and the recording-and-reproducing core 41 as shown in FIG. 8 can be substantially obtained. It should be noted that, at the time of the cutting, consideration is taken to the sizes (length) L(E) and L(R/W) for the respective cores 42 and 41.

When these cores 41 and 42 are viewed from the direction of their slicing, it will be found that, as shown in FIG. 9(A), that they have the rough surfaces which contain conspicuous irregularities. In order therefore to remove such irregularities from their sliced surfaces and form a mirror surface in a required thickness (for example, with the core to be used for the floppy having 135 tracks per inch, the surface roughness of 0.02 μm for the thickness of approximately 0.12 mm), lapping or polishing work becomes necessary (vide: steps F4 and F5 in FIG. 5). The lapping or polishing work is done as shown in FIGS. 10 and 11, wherein the core 41 or 42 after being sliced is fixed onto an adhesive stool 14 by use of an adhesive agent such as wax, etc. so as to be readily peelable, followed by polishing the same on a grind stone 15 in the dry or wet system. The state of the core after its polishing work is as shown in FIG. 9(B), wherein its thickness is reduced from $(T+\Delta)$ to $(T)$. Incidentally, a reference letter (AL) in FIGS. 9(A) and 9(B) designates a width of a joining layer 10 between the magnetic material 72 and the non-magnetic material 81, while a reference letter (GL) denotes a width of the magnetic gap 2.

After completion of the above-described work, these cores 41 and 42 are assembled into the magnetic head 1 as shown in FIGS. 2 to 4 (vide: step F6 in FIG. 5).

By the way, owing to the advancement in technology in recent years, the quantity of information to be stored in a single sheet of floppy tends to increase more and more. In particular, there has been widely adopted a method of narrowing the breadth of the track for increasing the number of tracks to be contained in the radial direction of the floppy of one and the same shape and size. When the track density increases and the track width becomes narrow as such, the width of the erasing core and the recording-and-reproducing core should be made correspondingly thin.

Describing more specifically, in order to increasing the capacity of the floppy, it may be contemplated to shorten a magnetic flux reversing interval, to increase the number of information tracks, to increase the number of floppy sheets to be used, or others. For the purpose of increasing the number of the information tracks, thinning of the cores 41 and 42 is required as mentioned in the foregoing. The floppy which is used widely at present contains 48 information tracks per inch (such floppy will hereinafter be denoted simply as "48TPI"), so the thickness of the recording-and-reproducing core 41 would be approximately 0.33 mm and that of the erasing core 42 would be approximately 0.165 mm or so. In order therefore to increase the density of the information tracks from 48TPI to 96TPI, 135TPI, or 200TPI, the thickness of the core must be reduced more and more with the consequence that the technique of such thinning work of the core has added much more importance to the manufacture of the magnetic head. On account of this, more efficient and productive techniques of thinning the core are desirable.

From this standpoint of thinning the core, however, the above-described conventional technique cannot always be said to be favourable. The reason for this is that, firstly, since the cores 41 and 42 are made of hard and brittle material such as ferrite, as its magnetic material, they are liable to produce cracks 18 in their polishing work, as shown in FIG. 10; secondly, since the cores 41 and 42 are of such a construction that each of them has in itself a U-shaped portion and an L-shaped portion as shown in FIGS. 7 and 8, which would inevitably weaken its strength in the thickness direction as well as in the direction perpendicular to the thickness to a considerable degree. Especially, the mutual joining of the magnetic materials 71 and 72 forming the U-shaped portion is done by fusion-bonding of glass 9, owing to which this U-shaped portion is weaker than the non-magnetic material 81 forming the L-shaped portion against external force. The cracks 18 to be possibly created in this U-shaped portion exercises remarkable influence on the magnetic properties of the core, and is liable to lower the rate of yield of the core.

Further, cracks may possibly take place even at the other steps than the polishing work. For instance, in the washing step, an ultra-sonic washer or the like is employed for the necessity of efficiently washing a large quantity of cores which have been peeled off the adhesive stool 14, the cores often get entangled among themselves to break a part of the U-shaped or L-shaped portions thereof.

The present invention has been made in view of the above-described disadvantages inherent in the conventional magnetic head and the method of its manufacture, and aims at providing an improved magnetic head and the method of its manufacture, according to which the thinning of the core is suitably attained together with the improved productivity.

Preferred ways of carrying out the invention are described in detail below with reference to drawings which illustrate specific embodiments thereof, in which:

FIGS. 6 to 9 are respectively a perspective view of the cores as assembled, a front view of the erasing core, a front view of the recording-and-reproducing core, and enlarged views of the assembled core showing its surface conditions, one as sliced and the other as polished, for explaining the steps of manufacturing the conventional magnetic head;

FIGS. 10 and 11 are explanatory diagrams for the polishing step in the conventional method for manufacture;

FIG. 12 is a plan view of the magnetic head according to the present invention as shown in FIG. 1 above;

FIG. 13 is a bottom view of the same;

FIG. 14 is a flow chart showing one example of the method for manufacturing the magnetic head according to the present invention;

The characteristic point of the present invention resides in that the polishing work is effected while closing the open end of the magnetic member and the non-magnetic member, after which appropriate cutting is done to form an assembled body of the magnetic core and the non-magnetic structure.

Since the polishing work is performed in the state of the open end of the magnetic and non-magnetic members as assembled being closed, the core exhibits sufficient durability against external force, hence no cracks are produced.

In the following, the magnetic head as well as the method for its manufacture according to the present invention will be described in detail in reference to the accompanying drawing.

Figure 3:
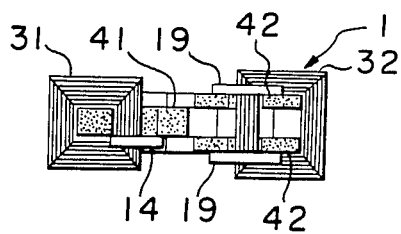
FIGS. 2 to 4 are respectively front view, plan view and bottom view showing one example of a conventional magnetic head.
Figure 1:
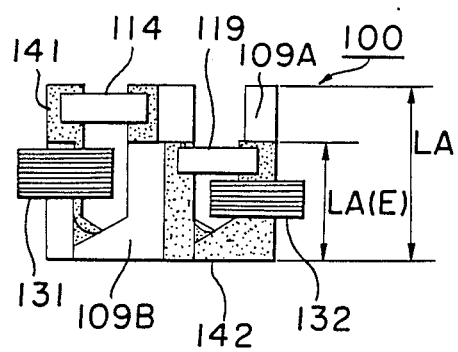
FIG. 1 is a front view showing one embodiment of the magnetic head according to the present invention.
Figure 4:
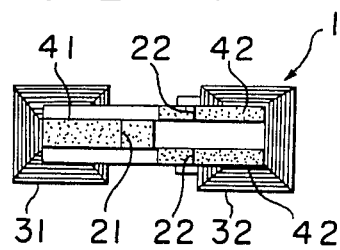
Figure 2:
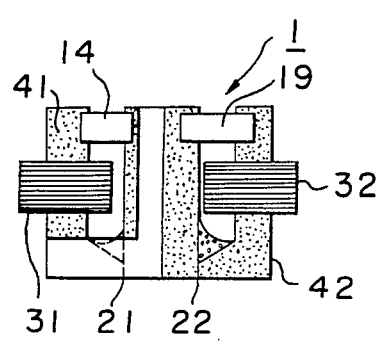
Figure 5:
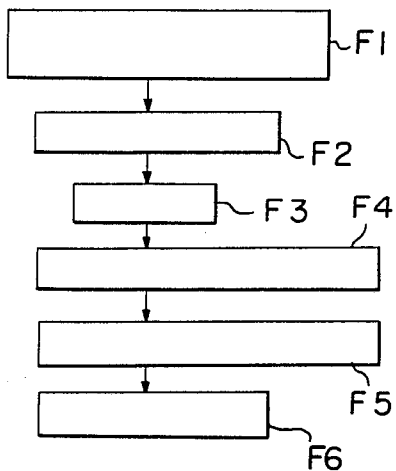
FIG. 5 is a flow chart showing one example of conventional method for producing the magnetic head.
Figure 6:
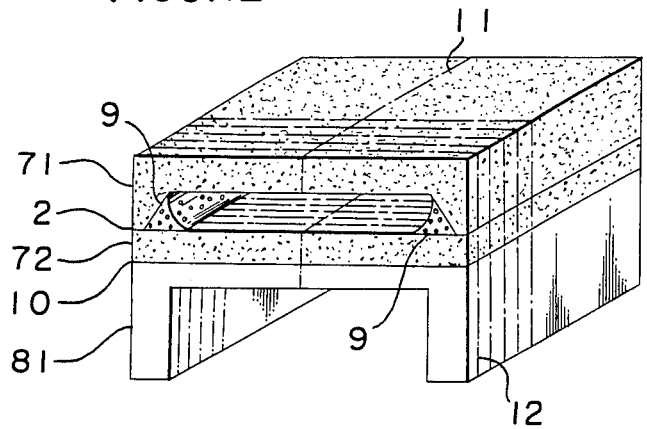
Figure 7:
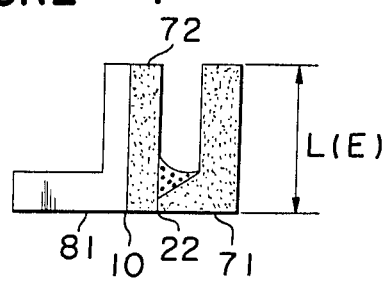
Figure 8:
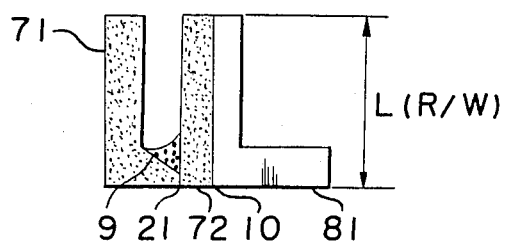

FIGS. 1, 12 and 13 illustrate one embodiment of the magnetic head according to the present invention, in which FIG. 1 is a front view, FIG. 12 is a plan view, and FIG. 13 is a bottom view. In these FIGS. 1, 12 and 13, the recording-and-reproducing core 141 and the erasing core 142 are alternately disposed, the respective cores having the non-magnetic members 109A and 109B. Both these cores are substantially in the shape of a letter "U", wherein the non-magnetic member 109A is held between the erasing cores 142, while the recording-and-reproducing core 141 is held between the non-magnetic members 109B.

The recording-and-reproducing winding 131 is wound on and around one of the legs of the U-shaped recording-and-reproducing core 141 inclusive of the non-magnetic members 109B; while, the erasing winding 132 is wound on and around one of the legs of the U-shaped erasing cores 142 inclusive of the non-magnetic member 109A. At the bottom part of the recording-and-reproducing core 141, there is formed the recording-and-reproducing magnetic gap 121; while, at the bottom part of each erasing core 142, there is formed the erasing magnetic gap 122. The transverse plate 114 is joined at and on the open end part of the U-shaped recording-and-reproducing core 141, while the transverse plates 119 are joined at and on the open end part of the U-shaped erasing cores 142, each of the transverse plates forming a part of the magnetic paths. Joining of these transverse plates 114 and 119 are effected by use of an epoxy type or a cyanoacrylic type adhesive agent. Incidentally, the length LA(E) of the erasing core 142 is made shorter than the length LA(R/W) of the recording-and-reproducing core 141. The same can be said of the non-magnetic members 109A and 109B. Further, both recording-and-reproducing core 141 and non-magnetic member 109A have the same length LA(R/W), while both erasing cores 142 and non-magnetic members 109B have the same length LA(E).

Figure 15:
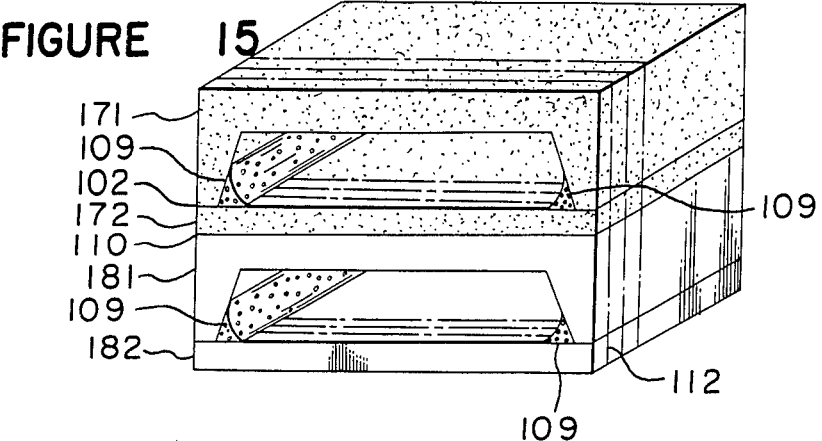
FIGS. 15 and 16 are respectively perspective views showing the magnetic head as assembled, but before it is halved.

In the following, explanations will be given as to the method of manufacturing the magnetic head of the above-described construction. One example of such a production method is shown in FIG. 14 in the form of a flow chart. Also, the sequence of manufacture of the magnetic head is illustrated in FIGS. 15 through 18. As seen from these FIGS. 14 through 18, at the joined end part between the first magnetic member 171 having its cross-sectional shape of an angled "U" and the second magnetic member 172 having the planar shape, the magnetic gap 102 is formed of glass or like materials having a large magnetic resistance by means of vapor-deposition, sputtering, and so on (vide: FIG. 15). That is to say, these magnetic members 171 and 172 are put together in an integral structure by fusion-bonding of the glass material 109 from the inside of the connection between both magnetic members (vide: step FA1 in FIG. 14).

In the same manner, the first non-magnetic member 181 having its cross-sectional shape of a substantially angled "U" and the second magnetic member 182 having the planar shape are put together to form an integral core structure (vide: step FA2 in FIG. 14). This joining may also be done by use of an epoxy type adhesive agent, and so on. After joining of these non-magnetic members, both assembled magnetic member and assembled non-magnetic member are put together through a joining layer 110 of an epoxy type adhesive agent, or the like in such a manner that the top surface of the assembled non-magnetic member 181 may be joined with the bottom surface of the assembled magnetic member 172 (vide: step FB in FIG. 14).

Figure 16:
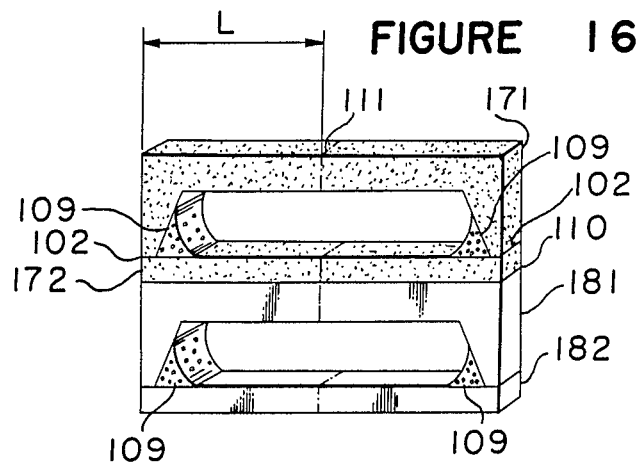

After a lapse of time for sufficient curing of the adhesive agent, the combination of the magnetic and non-magnetic members is sliced along the slice-lines 112 (vide: step FC in FIG. 14). FIG. 16 illustrates the state of the combination after the slicing. This slicing operation is done by use of an inner blade or an outer blade type slicing table, etc. so as to obtain the cores, each having a thickness of, for example, approximately 0.15 mm in the case of the information track density of 135TPI.

Figure 17:
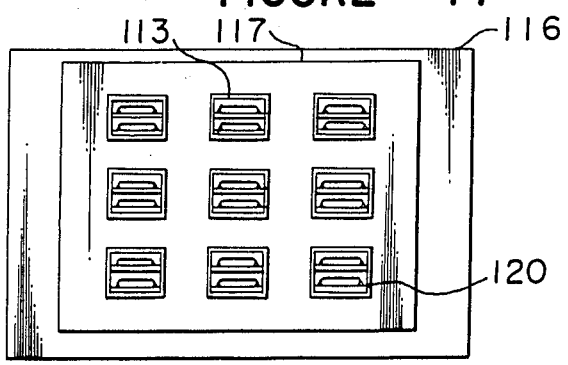
FIGS. 17 and 18 are explanatory diagrams for the polishing step according to the present invention.
Figure 18:
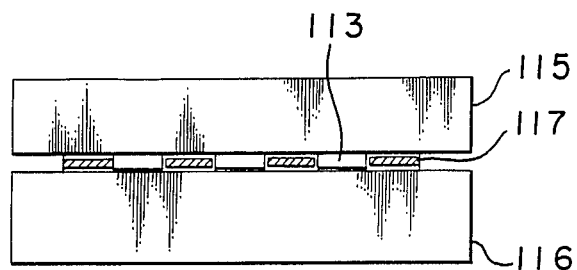

Since the sliced surface of the core, after the above-described slicing work, is rough and irregular as has already been shown in FIG. 9(A), the polishing work is effected, as shown in FIG. 9(B), for removal of the irregularities on its sliced surface and for rendering it to be in a predetermined thickness (vide: step FD in FIG. 14). In the case of the information track density being 135TPI, the sliced thickness of the core and its surface roughness are kept at 0.12 mm and 0.02 $\mu$m, respectively, for which the lapping or polishing work is effected to render the sliced surface to be in a mirror-surface condition. This polishing work is done by the method as shown in FIGS. 17 and 18.

Explaining in detail, a carrier 117 is placed on a grind stone 116. This carrier 117 has a number of openings 120 perforated therein, into each of which the sliced core as shown in FIG. 16 is received with a small clearance between the circumference of the core and the surrounding frame opening. The thickness of the carrier plate 117 is made thinner than the finished thickness of the core 113 as polished (i.e., the thickness (T) as shown in FIG. 9(B)). The sliced core 113 is placed into each and every opening 120, and then the core 113 is subjected to the polishing work on its both surfaces by means of a double surface grinding machine provided with the grind stones 115 and 116. That is to say, both surfaces of the core 113 as sliced are subjected to the simultaneous polishing, in the course of which it is lapped or polished with the properly selected grind stones 115 and 116 (see: FIG. 18).

It will be seen that, in this polishing work, since the core 113 is in the form of a closed frame having no open end part, unlike the conventional core as shown in FIGS. 7 to 10, it shows high strength against external force at the time of the polishing work with the consequence that occurrence of the cracks 118 as shown in FIG. 10 becomes subdued. Also, since the polishing work is performed by use of the carrier plate 117, into each and every opening 120 of which the core 113 is placed, there is no necessity for additional fixing means such as adhesive agent, and so on. On account of this, a large quantity of cores 113 can be worked simultaneously.

After the above-described polishing work, there follows cutting of the core 113 along the center cutting line 111 as shown in FIG. 16 (vide: step FE in FIG. 14), by which the recording-and-reproducing core 141 in the form of a letter "W", in its cross-section, the legs of which are upright and parallel one another. For the erasing core 142, the same thing can be said of its shape with the exception that the erasing magnetic gap 122 is larger than the recording-and-reproducing magnetic gap 121. The erasing core can also be manufactured following the same steps as those described in the foregoing.

Subsequently, assembly of the magnetic head 100 is carried out (vide: step FF in FIG. 14). As shown in FIGS. 1, 12 and 13, the recording-and-reproducing core 141 is held between the two erasing cores 142 by way of the non-magnetic member, the combination being stuck together by use of an epoxy type adhesive agent, etc. to form an integral three-layered structure. Thereafter, the recording-and-reproducing winding 131 and the erasing winding 132 are respectively mounted on the leg part of the recording-and-reproducing core 141 and the erasing core 142. Subsequently, the transverse plates 114 and 119 are joined to the respective recording-and-reproducing core 141 and erasing core 142 in a manner to span the end parts of the legs of each core by use of an epoxy type adhesive agent, etc.

In the following, the other embodiments of the present invention will be described in reference to FIGS. 19 to 24.

Figure 19:
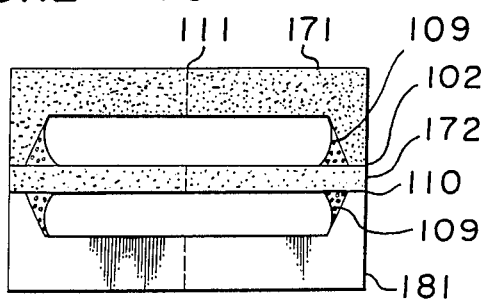
FIGS. 19 to 24 illustrate different structures of the assembled core according to the present invention.
Figure 20:
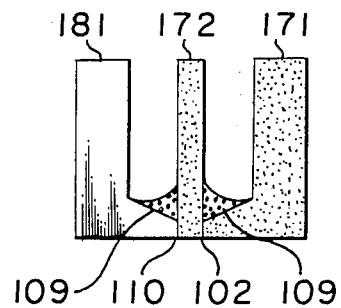

In the embodiment as shown in FIGS. 19 and 20, the non-magnetic member 182 is dispensed with, in contrast to the above-described embodiment, and the non-magnetic member 181 is joined to the second magnetic member 172 with its leg portions being directed thereto.

Figure 21:
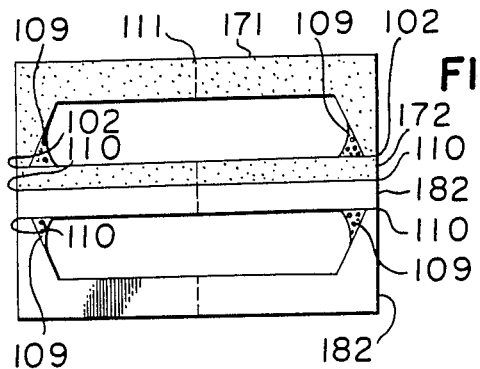
Figure 22:
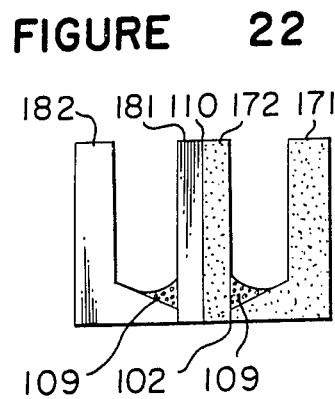

In the embodiment as shown in FIGS. 21 and 22, the combination of the non-magnetic members 181 and 182 is joined to the combination of the magnetic members 171 and 172 in opposite direction to that of the embodiment shown in FIG. 16, i.e., the bottom surface of the non-magnetic member 182 is joined together with the bottom surface of the magnetic member 172.

Figure 23:
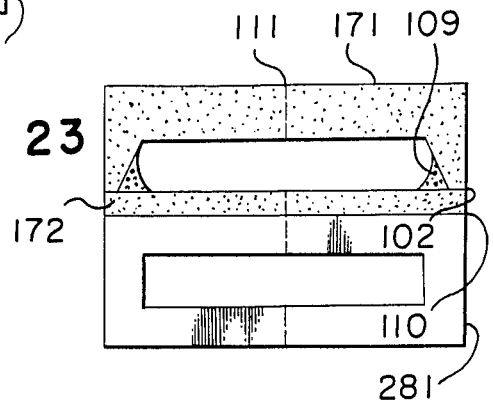
Figure 24:
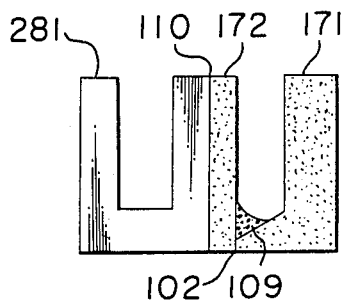

In the embodiment shown in FIGS. 23 and 24, the non-magnetic member 281 is in the form of a rectangular frame from the beginning.

In the core of either structure as described above, the assembled core, in its state prior to cutting along the center slicing line, is in the form of a frame having no open end, which prevents the undesirable cracks from being created.

Moreover, the present invention is not limited at all to the above-described embodiments, but its shape and size, in particular, may be appropriately varied. The applicable field of the present invention is also not limited to the floppy alone. For others, while the closure of the open end of the magnetic member or the non-magnetic member may be done by joining the open ends of these two members, this is not the only alternative, but any other expedients may be adopted such as fastening an appropriate member to the open end therer of.

As has been described in the foregoing, according to the magnetic head and the method for its manufacture of the present invention, since the polishing work of the assembled core is done in the state of the open ends of the constituent elements being closed, the occurrence of the cracks can be subdued, and the thinning of the core can be realized. Furthermore, the present invention provides various favourable effects such that both surfaces of the core can be polished at the same time, and that the polishing work can be simplified by use of the carrier plate, which contributes to improvement in the productivity of the core, and so forth.

I claim:

1. A method for manufacturing a magnetic head of a construction, wherein first and second magnetic cores each having a magnetic gap are joined with first and second non-magnetic structures, the arrangement of said cores in said head being such that the first magnetic core is in contact with the second non-magnetic structure, and that the second magnetic core is in contact with the first non-magnetic structure, said method for manufacture comprising the first step of producing a core body by forming a closed magnetic member and forming a closed non-magnetic member and joining the two closed members together; the second step of placing said core body in an opening formed in a carrier plate without the use of adhesive material, followed by polishing both sides of said core body at the same time while said core body is held in said carrier plate; and a third step of cutting the core body to form two constituent elements each having a U-shaped magnetic member joined to a U-shaped non-magnetic member.

* * * * *

UNITED STATES PATENT AND TRADEMARK OFFICE
CERTIFICATE OF CORRECTION

PATENT NO. : 4,745,676

DATED : May 24, 1988

INVENTOR(S) : Tadashi HASEGAWA

It is certified that error appears in the above-identified patent and that said Letters Patent is hereby corrected as shown below:

On the Title Page, and in Column 1, Line 2, the word "MAGNET" in the Title of the invention should be corrected to read "MAGNETIC".

Signed and Sealed this

Twentieth Day of September, 1988

Attest:

DONALD J. QUIGG

Attesting Officer

Commissioner of Patents and Trademarks